United States Patent
Kang et al.

(10) Patent No.: US 10,928,189 B2
(45) Date of Patent: Feb. 23, 2021

(54) INTENSITY-MODULATED LIGHT PATTERN FOR ACTIVE STEREO

(71) Applicant: Microsoft Technology Licensing, LLC, Redmond, WA (US)

(72) Inventors: Sing Bing Kang, Redmond, WA (US); Andreas Georgiou, Cambridge (GB); Richard S. Szeliski, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/912,555

(22) Filed: Mar. 5, 2018

(65) Prior Publication Data
US 2018/0260623 A1     Sep. 13, 2018

Related U.S. Application Data

(63) Continuation of application No. 13/915,626, filed on Jun. 11, 2013, now abandoned.
(Continued)

(51) Int. Cl.
*G01B 11/25* (2006.01)
*H04N 5/33* (2006.01)
(Continued)

(52) U.S. Cl.
CPC .......... *G01B 11/2513* (2013.01); *B29C 64/00* (2017.08); *B29C 64/386* (2017.08);
(Continued)

(58) Field of Classification Search
CPC . A63F 13/213; B29C 64/386; B29C 67/0051; G01B 11/22; G01B 11/25; G01B 11/2513; G01B 11/2527; G01B 11/2545; G02B 27/4205; G02B 27/4233; G02B 27/44; G02B 5/1895; G06F 11/3024;
(Continued)

(56) References Cited

U.S. PATENT DOCUMENTS 3,938,102 A   2/1976 Morrin et al.
5,351,152 A   9/1994 Kuo et al.
(Continued)

FOREIGN PATENT DOCUMENTS

CN   1244008 A   2/2000
CN   1414412 A   4/2003
(Continued)

OTHER PUBLICATIONS

"Second Written Opinion Issued in PCT Application No. PCT/US2014/033915", dated Jan. 8, 2015, 9 Pages.
(Continued)

*Primary Examiner* — Francis Geroleo

(57) ABSTRACT

The subject disclosure is directed towards projecting light in a pattern in which the pattern contains components (e.g., spots) having different intensities. The pattern may be based upon a grid of initial points associated with first intensities and points between the initial points with second intensities, and so on. The pattern may be rotated relative to cameras that capture the pattern, with captured images used active depth sensing based upon stereo matching of dots in stereo images.

20 Claims, 10 Drawing Sheets

Related U.S. Application Data

(60) Provisional application No. 61/812,232, filed on Apr. 15, 2013.

(51) Int. Cl.

| | | |
|---|---|---|
| *G06K 9/62* | (2006.01) | |
| *G06F 11/30* | (2006.01) | |
| *G06F 3/06* | (2006.01) | |
| *G06F 9/30* | (2018.01) | |
| *G06F 12/02* | (2006.01) | |
| *G06F 12/00* | (2006.01) | |
| *H04N 13/128* | (2018.01) | |
| *H04N 13/25* | (2018.01) | |
| *H04N 13/254* | (2018.01) | |
| *H04N 13/271* | (2018.01) | |
| *G06T 7/586* | (2017.01) | |
| *H04N 5/225* | (2006.01) | |
| *H04N 17/00* | (2006.01) | |
| *G06T 1/60* | (2006.01) | |
| *H04N 13/239* | (2018.01) | |
| *B29C 64/386* | (2017.01) | |
| *B29C 64/00* | (2017.01) | |
| *H04N 9/04* | (2006.01) | |
| *G02B 27/42* | (2006.01) | |
| *G06K 9/00* | (2006.01) | |
| *G02B 5/18* | (2006.01) | |
| *G02B 27/44* | (2006.01) | |
| *G01B 11/22* | (2006.01) | |
| *G06T 7/00* | (2017.01) | |
| *H04N 13/00* | (2018.01) | |
| *A63F 13/213* | (2014.01) | |

(52) U.S. Cl.
CPC .............. *G01B 11/22* (2013.01); *G01B 11/25* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01); *G06F 3/0659* (2013.01); *G06F 3/0683* (2013.01); *G06F 9/3004* (2013.01); *G06F 9/30043* (2013.01); *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01); *G06K 9/00201* (2013.01); *G06K 9/00536* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/04517* (2018.08); *H04N 13/128* (2018.05); *H04N 13/239* (2018.05); *H04N 13/25* (2018.05); *H04N 13/254* (2018.05); *H04N 13/271* (2018.05); *H04N 17/002* (2013.01); *A63F 13/213* (2014.09); *G02B 27/4233* (2013.01); *G06T 2207/30244* (2013.01); *H04N 2013/0081* (2013.01)

(58) Field of Classification Search
CPC ...... G06F 12/00; G06F 12/02; G06F 12/0207; G06F 12/0292; G06F 3/0653; G06F 3/0659; G06F 3/0683; G06F 9/3004; G06F 9/30043; G06F 9/30127; G06K 9/00201; G06K 9/00536; G06K 9/0063; G06K 9/62; G06T 1/60; G06T 2207/30244; G06T 7/00; G06T 7/586; H04N 13/0022; H04N 13/02; H04N 13/0239; H04N 13/025; H04N 13/0253; H04N 13/0271; H04N 17/002; H04N 2013/0081; H04N 5/2256; H04N 5/33; H04N 5/332; H04N 9/045

See application file for complete search history.

(56) References Cited

U.S. PATENT DOCUMENTS

| | | |
|---|---|---|
| 5,471,326 A | 11/1995 | Hall et al. |
| 5,586,200 A | 12/1996 | Devaney et al. |
| 5,739,906 A | 4/1998 | Evans et al. |
| 6,105,139 A | 8/2000 | Dey et al. |
| 6,751,344 B1 * | 6/2004 | Grumbine .......... G01B 11/2513 382/128 |
| 7,315,383 B1 | 1/2008 | Abdollahi |
| 7,512,262 B2 | 3/2009 | Criminisi et al. |
| 7,565,003 B2 | 7/2009 | Ashizaki et al. |
| 7,634,395 B2 | 12/2009 | Flandrin et al. |
| 8,077,034 B2 | 12/2011 | Borlez et al. |
| 8,331,654 B2 | 12/2012 | Abraham et al. |
| 8,442,940 B1 | 5/2013 | Faletti et al. |
| 8,787,656 B2 | 7/2014 | Park et al. |
| 8,818,077 B2 | 8/2014 | Hwang |
| 9,508,003 B2 | 11/2016 | Eguro et al. |
| 9,697,424 B2 | 7/2017 | Kirk et al. |
| 9,760,770 B2 | 9/2017 | Eguro et al. |
| 9,922,249 B2 | 3/2018 | Kang et al. |
| 9,928,420 B2 | 3/2018 | Kirk et al. |
| 9,959,465 B2 | 5/2018 | Georgiou et al. |
| 2002/0136444 A1 | 9/2002 | Brown et al. |
| 2003/0043270 A1 | 3/2003 | Rafey et al. |
| 2003/0048459 A1 | 3/2003 | Gooch |
| 2003/0081833 A1 | 5/2003 | Tilton |
| 2004/0105580 A1 | 6/2004 | Hager et al. |
| 2004/0125222 A1 | 7/2004 | Bradski et al. |
| 2004/0201586 A1 | 10/2004 | Marschner et al. |
| 2005/0058362 A1 | 3/2005 | Kita |
| 2005/0234527 A1 | 10/2005 | Slatkine |
| 2005/0257748 A1 | 11/2005 | Kriesel et al. |
| 2005/0279172 A1 | 12/2005 | Schreier et al. |
| 2006/0176306 A1 | 8/2006 | Nagaraj et al. |
| 2006/0210146 A1 | 9/2006 | Gu |
| 2006/0238714 A1 | 10/2006 | Fox et al. |
| 2006/0291020 A1 | 12/2006 | Knox et al. |
| 2007/0009150 A1 | 1/2007 | Suwa et al. |
| 2007/0145273 A1 | 6/2007 | Chang |
| 2007/0146512 A1 | 6/2007 | Suzuki et al. |
| 2007/0183657 A1 | 8/2007 | Kidono et al. |
| 2007/0253310 A1 | 11/2007 | Ikenaka |
| 2007/0263903 A1 | 11/2007 | St hilaire et al. |
| 2008/0118143 A1 | 5/2008 | Gordon et al. |
| 2008/0130015 A1 | 6/2008 | Lu |
| 2008/0165357 A1 | 7/2008 | Stern et al. |
| 2008/0187711 A1 | 8/2008 | Alam et al. |
| 2008/0205748 A1 | 8/2008 | Lee et al. |
| 2008/0218612 A1 | 9/2008 | Border et al. |
| 2008/0278570 A1 | 11/2008 | Gharib et al. |
| 2008/0283729 A1 | 11/2008 | Hosaka |
| 2009/0021750 A1 | 1/2009 | Komer et al. |
| 2009/0080048 A1 | 3/2009 | Tsao |
| 2009/0096783 A1 | 4/2009 | Shpunt et al. |
| 2009/0217213 A1 | 8/2009 | Meserve |
| 2009/0217214 A1 | 8/2009 | Meserve |
| 2009/0231425 A1 | 9/2009 | Zalewski |
| 2009/0273679 A1 | 11/2009 | Gere et al. |
| 2010/0042964 A1 | 2/2010 | Meserve |
| 2010/0046004 A1 | 2/2010 | Lee et al. |
| 2010/0074532 A1 * | 3/2010 | Gordon .................. G01B 11/25 382/203 |
| 2010/0177164 A1 | 7/2010 | Zalevsky et al. |
| 2010/0202725 A1 | 8/2010 | Popovich et al. |
| 2010/0277571 A1 | 11/2010 | Xu et al. |
| 2010/0289885 A1 | 11/2010 | Lu et al. |
| 2011/0025827 A1 | 2/2011 | Shpunt et al. |
| 2011/0063427 A1 | 3/2011 | Fengler et al. |
| 2011/0078189 A1 | 3/2011 | Bonchi et al. |

(56) References Cited

U.S. PATENT DOCUMENTS

| | | |
|---|---|---|
| 2011/0080487 A1 | 4/2011 | Venkataraman et al. |
| 2011/0091096 A1 | 4/2011 | Morris et al. |
| 2011/0103711 A1 | 5/2011 | Su et al. |
| 2011/0149031 A1 | 6/2011 | Um et al. |
| 2011/0222757 A1 | 9/2011 | Yeatman et al. |
| 2011/0228097 A1 | 9/2011 | Motta |
| 2011/0310220 A1 | 12/2011 | Mceldowney |
| 2012/0002045 A1 | 1/2012 | Tony et al. |
| 2012/0025080 A1 | 2/2012 | Liu et al. |
| 2012/0038986 A1* | 2/2012 | Pesach .............. G01S 17/74 359/572 |
| 2012/0056982 A1 | 3/2012 | Katz et al. |
| 2012/0087572 A1 | 4/2012 | Dedeoglu et al. |
| 2012/0120494 A1 | 5/2012 | Takayama |
| 2012/0154397 A1 | 6/2012 | Chernikov et al. |
| 2012/0155747 A1 | 6/2012 | Hwang |
| 2012/0242829 A1 | 9/2012 | Shin et al. |
| 2012/0253201 A1 | 10/2012 | Reinhold |
| 2012/0262553 A1 | 10/2012 | Chen et al. |
| 2012/0281087 A1 | 11/2012 | Kruse |
| 2012/0294510 A1 | 11/2012 | Zhang et al. |
| 2012/0307075 A1 | 12/2012 | Margalit |
| 2013/0002814 A1 | 1/2013 | Park et al. |
| 2013/0003069 A1 | 1/2013 | Umeda et al. |
| 2013/0051657 A1 | 2/2013 | Ostermann et al. |
| 2013/0083062 A1 | 4/2013 | Geisner et al. |
| 2013/0095302 A1 | 4/2013 | Pettis et al. |
| 2013/0100256 A1 | 4/2013 | Kirk et al. |
| 2013/0100282 A1 | 4/2013 | Siercks |
| 2013/0141545 A1 | 6/2013 | Macchia et al. |
| 2013/0141611 A1 | 6/2013 | Hirai et al. |
| 2013/0215235 A1 | 8/2013 | Russell |
| 2013/0229396 A1 | 9/2013 | Huebner |
| 2013/0265623 A1 | 10/2013 | Sugiyama et al. |
| 2013/0278631 A1 | 10/2013 | Border et al. |
| 2013/0287291 A1 | 10/2013 | Cho |
| 2013/0335531 A1 | 12/2013 | Lee et al. |
| 2014/0055560 A1 | 2/2014 | Fu et al. |
| 2014/0098342 A1 | 4/2014 | Webb |
| 2014/0104387 A1 | 4/2014 | Klusza et al. |
| 2014/0112573 A1 | 4/2014 | Francis et al. |
| 2014/0120319 A1 | 5/2014 | Joseph |
| 2014/0132501 A1 | 5/2014 | Choi et al. |
| 2014/0132728 A1 | 5/2014 | Verano et al. |
| 2014/0139717 A1 | 5/2014 | Short |
| 2014/0168380 A1* | 6/2014 | Heidemann .......... G01B 11/25 348/47 |
| 2014/0180639 A1 | 6/2014 | Cheatham et al. |
| 2014/0184584 A1 | 7/2014 | Reif et al. |
| 2014/0206443 A1 | 7/2014 | Sharp et al. |
| 2014/0225985 A1 | 8/2014 | Klusza et al. |
| 2014/0225988 A1 | 8/2014 | Poropat |
| 2014/0241612 A1 | 8/2014 | Rhemann et al. |
| 2014/0293011 A1* | 10/2014 | Lohry ............... H04N 13/254 348/47 |
| 2014/0307047 A1 | 10/2014 | Kirk et al. |
| 2014/0307055 A1 | 10/2014 | Kang et al. |
| 2014/0307057 A1 | 10/2014 | Kang et al. |
| 2014/0307058 A1 | 10/2014 | Kirk et al. |
| 2014/0307098 A1 | 10/2014 | Kang et al. |
| 2014/0307307 A1 | 10/2014 | Georgiou et al. |
| 2014/0307952 A1 | 10/2014 | Sweeney et al. |
| 2014/0307953 A1 | 10/2014 | Kirk et al. |
| 2014/0309764 A1 | 10/2014 | Socha-leialoha et al. |
| 2014/0310496 A1 | 10/2014 | Eguro et al. |
| 2014/0320605 A1 | 10/2014 | Johnson |
| 2014/0354803 A1 | 12/2014 | Chida |
| 2015/0078672 A1 | 3/2015 | Eguro et al. |
| 2015/0316368 A1* | 11/2015 | Moench ............... H01S 5/005 348/46 |
| 2017/0116757 A1 | 4/2017 | Shpunt et al. |
| 2018/0173947 A1 | 6/2018 | Kang et al. |
| 2018/0218210 A1 | 8/2018 | Georgiou et al. |

FOREIGN PATENT DOCUMENTS

| | | |
|---|---|---|
| CN | 1414420 A | 4/2003 |
| CN | 1445724 A | 10/2003 |
| CN | 1541483 A | 10/2004 |
| CN | 1669051 A | 9/2005 |
| CN | 1735789 A | 2/2006 |
| CN | 101061367 A | 10/2007 |
| CN | 101124514 A | 2/2008 |
| CN | 101309429 A | 11/2008 |
| CN | 101443809 A | 5/2009 |
| CN | 101501442 A | 8/2009 |
| CN | 101509764 A | 8/2009 |
| CN | 101711354 A | 5/2010 |
| CN | 101878409 A | 11/2010 |
| CN | 102027434 A | 4/2011 |
| CN | 102036599 A | 4/2011 |
| CN | 102231037 A | 11/2011 |
| CN | 102362150 A | 2/2012 |
| CN | 102385237 A | 3/2012 |
| CN | 102572485 A | 7/2012 |
| CN | 102638692 A | 8/2012 |
| CN | 102760234 A | 10/2012 |
| CN | 102803894 A | 11/2012 |
| CN | 102831380 A | 12/2012 |
| CN | 102867328 A | 1/2013 |
| CN | 103308517 A | 9/2013 |
| EP | 0085210 A1 | 8/1983 |
| EP | 2295932 A1 | 3/2011 |
| EP | 2400261 A1 | 12/2011 |
| GB | 2481459 A | 12/2011 |
| JP | 2000341721 A | 12/2000 |
| JP | 2003058911 A | 2/2003 |
| JP | 2004135209 A | 4/2004 |
| JP | 2005341470 A | 12/2005 |
| JP | 2006229802 A | 8/2006 |
| JP | 2009014501 A | 1/2009 |
| JP | 2010011223 A | 1/2010 |
| JP | 2010504522 A | 2/2010 |
| JP | 2010145186 A | 7/2010 |
| JP | 2011514232 A | 5/2011 |
| JP | 2013544449 A | 12/2013 |
| KR | 20110046222 A | 5/2011 |
| KR | 20110132260 A | 12/2011 |
| KR | 101137646 B1 | 4/2012 |
| RU | 2237284 C2 | 9/2004 |
| WO | 2006016303 A2 | 2/2006 |
| WO | 2007132399 A1 | 11/2007 |
| WO | 2009046268 A1 | 4/2009 |
| WO | 2012137434 A1 | 10/2012 |

OTHER PUBLICATIONS

"International Preliminary Report on Patentability Issued in PCT Patent Application No. PCT/US2014/033916", dated Jul. 13, 2015, 7 Pages.

"International Search Report and Written Opinion Issued in PCT Application No. PCT/US2014/033916", dated Jul. 18, 2014, 8 Pages.

"Second Written Opinion Issued in PCT Application No. PCT/US2014/033916", dated Mar. 27, 2015, 6 Pages.

"International Preliminary Report on Patentability Issued in PCT Patent Application No. PCT/US2014/033917", dated Jul. 20, 2015, 8 Pages.

"International Search Report and Written Opinion Issued in PCT Application No. PCT/US2014/033917", dated Jul. 18, 2014, 10 Pages.

"International Preliminary Report on Patentability Issued in PCT Patent Application No. PCT/US2014/033919", dated Jul. 13, 2015, 7 Pages.

"International Search Report and Written Opinion Issued in PCT Application No. PCT/US2014/033919", dated Jul. 17, 2014, 8 Pages.

"Second Written Opinion Issued in PCT Application No. PCT/US2014/033919", dated Mar. 27, 2015, 6 Pages.

"International Search Report Issued in PCT Patent Application No. PCT/US2014/033996", dated Jul. 31, 2014, 3 Pages.

(56) References Cited

OTHER PUBLICATIONS

Yamaguchi, et al., "Interleaved Pixel Lookup for Embedded Computer Vision", In Proceedings of IEEE Computer Society Conference on Computer Vision and Pattern Recognition Workshops, Jun. 23, 2008, pp. 1-8.
Yang, et al., "Spatial-Depth Super Resolution for Range Images", In Proceedings of the IEEE Conference on Computer Vision and Pattern Recognition, Jun. 17, 2007, 8 Pages.
Yoon, et al., "Locally Adaptive Support-Weight Approach for Visual Correspondence Search", In Proceedings of IEEE Computer Society Conference on Computer Vision and Pattern Recognition, Jun. 20, 2005, 8 Pages.
"Connected component (Graph Theory)",Retrieved From: https://en.wikipedia.org/w/index.php?title=Connected_component_(graph_theory)&oldid=841872370, Retrieved on: May 18, 2018, 3 Pages.
"Third Office Action Issued in Chinese Patent Application No. 201480021958.7", dated Dec. 3, 2018, 10 Pages.
"Final Office Action Issued in U.S. Appl. No.13/915,622", dated Mar. 9, 2018, 28 Pages.
"Final Office Action Issued in U.S. Appl. No. 13/915,622", dated Mar. 7, 2017, 28 Pages.
"Final Office Action Issued in U.S. Appl. No. 13/915,622", dated Jan. 21, 2016, 28 Pages.
"Non Final Office Action Issued in U.S. Appl. No. 13/915,622", dated Aug. 5, 2016, 39 Pages.
"Non Final Office Action Issued in U.S. Appl. No. 13/915,622", dated Sep. 2, 2015, 28 Pages.
"Non Final Office Action Issued in U.S. Appl. No. 13/915,622", dated Aug. 15, 2017, 27 pages.
"Final Office Action Issued in U.S. Appl. No. 13/915,626", dated Jul. 11, 2016, 13 Pages.
"Final Office Action Issued in U.S. Appl. No. 13/915,626", dated Mar. 28, 2017, 17 Pages.
"Non Final Office Action Issued in U.S. Appl. No. 13/915,626", dated Jan. 29, 2016, 17 Pages.
"Non Final Office Action Issued in U.S. Appl. No. 13/915,626", dated Dec. 9, 2016, 16 Pages.
"Final Office Action Issued in U.S. Appl. No. 13/918,892", dated Dec. 21, 2016, 6 Pages.
"Final Office Action Issued in U.S. Appl. No. 13/918,892", dated Nov. 19, 2015, 7 Pages.
"Non Final Office Action Issued in U.S. Appl. No. 13/918,892", dated Mar. 28, 2016, 6 Pages.
"Non Final Office Action Issued in U.S. Appl. No. 13/918,892", dated May 11, 2015, 6 Pages.
"Final Office Action Issued in U.S. Appl. No. 13/923,135", dated Oct. 3, 2016, 15 Pages.
"Final Office Action Issued in U.S. Appl. No. 13/923,135", dated Jul. 27, 2015, 21 Pages.
"Non Final Office Action Issued in U.S. Appl. No. 13/923,135", dated Mar. 31, 2016, 14 Pages.
"Non Final Office Action Issued in U.S. Appl. No. 13/923,135", dated Dec. 19, 2014, 13 Pages.
"Non Final Office Action Issued in U.S. Appl. No. 13/923,135", dated May 5, 2017, 17 Pages.
"Final Office Action Issued in U.S. Appl. No. 13/924,464", dated Sep. 27, 2017, 37 Pages.
"Final Office Action Issued in U.S. Appl. No. 13/924,464", dated Sep. 15, 2016, 25 Pages.
"Final Office Action Issued in U.S. Appl. No. 13/924,464", dated Dec. 17, 2015, 25 Pages.
"Non Final Office Action Issued in U.S. Appl. No. 13/924,464", dated May 17, 2016, 26 Pages.
"Non Final Office Action Issued in U.S. Appl. No. 13/924,464", dated Aug. 10, 2015, 20 Pages.
"Non Final Office Action Issued in U.S. Appl. No. 13/924,464", dated May 5, 2017, 38 Pages.
"Final Office Action Issued in U.S. Appl. No. 13/924,475", dated May 6, 2016, 13 Pages.
"Non Final Office Action Issued in U.S. Appl. No. 13/924,475", dated Sep. 8, 2016, 15 Pages.
"Non Final Office Action Issued in U.S. Appl. No. 13/924,475", dated Mar. 24, 2015, 17 Pages.
"Non Final Office Action Issued in U.S. Appl. No. 13/924,475", dated Oct. 7, 2015, 14 Pages.
"Final Office Action Issued in U.S. Appl. No. 13/924,485", dated Sep. 13, 2016, 16 Pages.
"Final Office Action Issued in U.S. Appl. No. 13/924,485", dated Jul. 20, 2017, 16 Pages.
"Non Final office Action Issued in U.S. Appl. No. 13/924,485", dated Dec. 15, 2015, 15 Pages.
"Non-Final Office Action Issued in U.S. Appl. No. 13/924,485", dated Mar. 7, 2017, 16 Pages.
"Final Office Action Issued in U.S. Appl. No. 13/925,762", dated May 9, 2017, 26 Pages.
"Final Office Action Issued in U.S. Appl. No. 13/925,762", dated May 11, 2016, 22 Pages.
"Non Final Office Action Issued in U.S. Appl. No. 13/925,762", dated Oct. 3, 2016, 28 Pages.
"Non Final Office Action Issued in U.S. Appl. No. 13/925,762", dated Nov. 5, 2015, 13 Pages.
"Non Final Office Action Issued in U.S. Appl. No. 14/088,408", dated Sep. 29, 2016, 16 Pages.
"Final Office Action Issued in U.S. Appl. No. 14/253,696", dated Feb. 25, 2016, 23 Pages.
"Non Final Office Action Issued in U.S. Appl. No. 14/253,696", dated Sep. 10, 2015, 18 Pages.
"Notice of Allowance Issued in U.S. Appl. No. 14/253,696", dated Jul. 21, 2016, 17 Pages.
"Office Action Issued in European Patent Application No. 14723271.4", dated Sep. 19, 2016, 9 Pages.
"Office Action Issued in European Patent Application No. 14723271.4", dated Jun. 29, 2017, 12 Pages.
"Oral Hearing Issued in European Patent Application No. 14723271.4", Mailed Date: Mar. 29, 2018, 10 Pages.
"Fourth Office Action Issued in Chinese Patent Application No. 201480021460.0", dated Jan. 24, 2019, 7 Pages.
"Third Office Action Issued in Chinese Patent Application No. 201480021493.5", dated Feb. 26, 2019, 10 Pages.
"Third Office Action Issued in Chinese Patent Application No. 201480021528.5", dated Feb. 11, 2019, 9 Pages.
"Office Action Issued in Australian Patent Application No. 2014254219", dated Apr. 19, 2017, 3 Pages.
"First Office Action and Search Report Issued in Chinese Patent Application No. 201480021199.4", dated May 31, 2017, 17 Pages.
"Second Office Action Issued in Chinese Patent Application No. 201480021199.4", dated Jan. 17, 2018, 7 Pages.
"Third Office Action Issued in Chinese Patent Application No. 201480021199.4", dated Jun. 19, 2018, 13 Pages.
"Office Action Issued in Chinese Patent Application No. 201480021422.5", dated Jul. 5, 2018, 10 Pages.
"First Office Action & Search Report Issued in Chinese Patent Application No. 201480021422.5", dated Mar. 21, 2017, 16 Pages.
"Second Office Action Issued in Chinese Patent Application No. 201480021422.5", dated Dec. 11, 2017, 14 Pages.
"First Office Action and Search Report Issued in Chinese Patent Application No. 201480021460.0", dated Mar. 28, 2017, 17 Pages.
"Second Office Action Issued in Chinese Patent Application No. 201480021460.0", dated Dec. 11, 2017, 6 Pages.
"Third Office Action Issued in Chinese Patent Application No. 201480021460.0", dated Jul. 2, 2018, 7 Pages.
"Office Action Issued in Chinese Patent Application No. 201480021487.X", dated Jun. 20, 2018, 7 Pages.
"First Office Action Issued in Chinese Application No. 201480021487.X", dated Apr. 21, 2017, 12 Pages.
"Second Office Action Issued in Chinese Patent Application No. 201480021487.X", dated Dec. 15, 2017, 10 Pages.
"Office Action Issued in Chinese Patent Application No. 201480021493.5", dated Dec. 19, 2017, 12 Pages.
"Second Office Action Issued in Chinese Patent Application No. 201480021493.5", dated Aug. 15, 2018, 10 Pages.

(56) References Cited

OTHER PUBLICATIONS

"Office Action Issued in Chinese Patent Application No. 201480021519.6", dated Sep. 4, 2018, 10 Pages.
"First Office Action and Search Report Issued in Chinese Patent Application No. 201480021519.6", dated Aug. 30, 2016, 18 Pages.
"Fourth Office Action Issued in Chinese Patent Application No. 201480021519.6", dated Mar. 8, 2018, 15 Pages.
"Office Action Issued in Chinese Patent Application No. 201480021519.6", dated Sep. 19, 2017, 14 Pages.
"Second Office Action and Search Report Issued in Chinese Patent Application No. 201480021519.6", dated Mar. 30, 2017, 17 Pages.
"First Office Action and Search Report Issued in Chinese Patent Application No. 201480021528.5", dated Dec. 11, 2017, 14 Pages.
"Second Office Action Issued in Chinese Patent Application No. 201480021528.5", dated Aug. 2, 2018, 8 Pages.
"First Office Action and Search Report Issued in Chinese Patent Application No. 201480021958.7", dated Oct. 18, 2017, 19 Pages.
"Second Office Action Issued in Chinese Patent Application No. 201480021958.7", dated Jun. 13, 2018, 16 Pages.
"Office Action Issued in Russian Patent Application No. 2015143654", dated Jan. 31, 2018, 8 Pages.
"Office Action Issued in Japanese Patent Application No. 2016-508993", dated Feb. 6, 2018, 5 Pages.
"Office Action Issued in Japanese Patent Application No. 2016-508993", dated Aug. 7, 2018, 5 Pages.
Anderson, et al., "The IBM System/360 Model 91: Machine Philosophy and Instruction-Handling", Published in IBM Journal of Research and Development, vol. 11, Issue 1, Jan. 1, 1967, pp. 8-24.
Chan, et al., "Regular Stereo Matching Improvement System Based on Kinect-Supporting Mechanism", In Open Journal of Applied Sciences, vol. 3, Issue 1, Mar. 30, 2013, 5 Pages.
Chihoub, et al., "A Band Processing Imaging Library for a Tricore-Based Digital Still Camera", In Research Article of Real-Time Imaging, vol. 7, Issue 4, Aug. 1, 2001, pp. 327-337.
Gao, et al., "Stereo Matching Algorithm Based on Illumination Normal Similarity and Adaptive Support Weight", In Optical Engineering, vol. 52, Issue 2, Feb. 2013, 8 Pages.
Gu, et al., "Trinocular Disparity Estimation With Adaptive Support Weight and Disparity Calibration", In Optical Engineering, vol. 47, Issue 3, Mar. 1, 2008, 5 Pages.
Hariyama, et al., "Optimal Periodical Memory Allocation for Logic-in-Memory Image Processors", In Proceedings of the Emerging VLSI Technologies and Architectures (ISVLSI'06), Mar. 2, 2006, pp. 193-198.
Hosni, et al., "Near Real-Time Stereo With Adaptive Support Weight Approaches", In Proceedings of International Symposium 3D Data Processing, Visualization and Transmission, May 17, 2010, 8 Pages.
Kanade, et al., "Development of a Video-Rate Stereo Machine", In Proceedings of IEEE/RSJ International Conference on Intelligent Robots and Systems. Human Robot Interaction and Cooperative Robots, Aug. 5, 1995, pp. 95-100.
Kuon, et al., "FPGA Architecture: Survey and Challenges", In Foundations and Trends in Electronic Design Automation vol. 2, Issue 2, Apr. 18, 2008, pp. 135-253.
Langmann, et al., "Depth Camera Technology Comparison and Performance Evaluation", In Proceedings of the 1st International Conference on Pattern Recognition Applications and Methods, Feb. 2012, 7 Pages.
McIlroy, et al., "Kinectrack: Agile 6-DoF Tracking Using a Projected Dot Pattern", In Proceedings of IEEE International Symposium on Mixed and Augmented Reality (ISMAR), Nov. 5, 2012, 7 Pages.
"Office Action Issued in Mexican Patent Application No. MX/a/2015/014577", dated Nov. 10, 2017, 3 Pages.
"International Preliminary Report on Patentability Issued in PCT Application No. PCT/US2014/033909", dated Jun. 29, 2015, 17 Pages.
"International Search Report and Written Opinion Issued in PCT Application No. PCT/US2014/033909", dated Jul. 25, 2014, 16 Pages.
"Second Written Opinion Issued in PCT Application No. PCT/US2014/033909", dated Mar. 25, 2015, 14 Pages.
"International Preliminary Report on Patentability Issued in PCT Application No. PCT/US2014/033910", dated Jul. 24, 2015, 8 Pages.
"International Search Report and Written Opinion Issued in PCT Application No. PCT/US2014/033910", dated Jul. 25, 2014, 9 Pages.
"Second Written Opinion Issued in PCT Patent Application No. PCT/US2014/033910", dated Dec. 18, 2014, 5 Pages.
"International Preliminary Report on Patentability Issued in PCT Patent Application No. PCT/US2014/033911", dated Jul. 13, 2015, 6 Pages.
"International Search Report and Written Opinion Issued in PCT Application No. PCT/US2014/033911", dated Aug. 29, 2014, 8 Pages.
"Second Written Opinion Issued in PCT Application No. PCT/US2014/033911", dated Apr. 2, 2015, 5 Pages.
"International Preliminary Report on Patentability Issued in PCT Application No. PCT/US2014/033915", dated Apr. 7, 2015, 10 Pages.
"International Search Report and Written Opinion Issued in PCT Application No. PCT/US2014/033915", dated Jul. 16, 2014, 11 Pages.
"Office Action Issued in Indian Patent Application No. 6032/CHENP/2015", dated Aug. 13, 2019, 6 Pages.
"Decision on Rejection Issued in Chinese Patent Application No. 201480021493.5", dated Aug. 21, 2019, 6 Pages.
"Notice on Reexamination Issued in Chinese Patent Application No. 201480021519.6", Mailed Date: Mar. 29, 2019, 8 Pages.
"Non Final Office Action Issued in U.S. Appl. No. 15/889,188", dated Jul. 9, 2019, 13 Pages.
"Office Action Issued in European Patent Application No. 14724934.6", dated Oct. 24, 2019, 8 Pages.
"Office Action Issued in European Patent Application No. 14724942.9", dated Oct. 21, 2019, 8 Pages.
"Office Action Issued in European Patent Application No. 14725312.4", dated Oct. 9, 2019, 5 Pages.
"Office Action Issued in European Patent Application No. 14725861.0", dated Nov. 8, 2019, 5 Pages.
"Office Action Issued in European Patent Application No. 14727992.1", dated Oct. 9, 2019, 8 Pages.
"Office Action Issued in Chinese Patent Application No. 201480021422.5", dated Nov. 12, 2019, 6 Pages.
Schuon, et al., "High-Quality Scanning Using Time-of-Flight Depth Superresolution", In Proceedings of IEEE Computer Society Conference on Computer Vision and Pattern Recognition Workshops, Jun. 23, 2008, 7 Pages.
"Office Action Issued in European Patent Application No. 14726261.2", dated Nov. 29, 2019, 8 Pages.
"Final Office Action Issued in U.S. Appl. No. 15/889,188", dated Jan. 17, 2020, 6 Pages.
"Non Final Office Action Issued in U.S. Appl. No. 15/937,851", dated Dec. 23, 2019, 14 Pages.
"Third Office Action Issued in Chinese Patent Application No. 201480021487.X", dated Feb. 28, 2020, 18 Pages.
"Office Action Issued in Indian Patent Application No. 6362/CHENP/2015", dated Feb. 26, 2020, 6 Pages.
"Office Action Issued in European Patent Application No. 14724942.9", dated Jul. 27, 2020, 7 Pages.
"Final Office Action Issued in U.S. Appl. No. 15/937,851", dated Jul. 28, 2020, 10 Pages.
"Notice of Allowance Issued in Korean Patent Application No. 10-2015-7032651", dated Apr. 13, 2020, 4 Pages.
"Office Action Issued in Korean Patent Application No. 10-2015-7032633", dated Apr. 29, 2020, 8 Pages.
"Extended European Search Report Issued in European Patent Application No. 20184935.3", dated Nov. 2, 2020, 8 Pages.
"Fourth Office Action Issued in Chinese Patent Application No. 201480021487.X", dated Aug. 31, 2020, 7 Pages.

(56) References Cited

OTHER PUBLICATIONS

"Notice of Allowance Issued in Chinese Patent Application No. 201480021487.X", dated Nov. 19, 2020, 8 Pages.

Li, et al., "3D Information Acquisition System Based on Line Shifting Method", In Journal of System Simulation, vol. 18, Aug. 2006, 5 Pages.

"Non Final Office Action Issued in U.S. Appl. No. 15/937,851", dated Dec. 22, 2020, 15 Pages.

* cited by examiner

INTENSITY-MODULATED LIGHT PATTERN FOR ACTIVE STEREO

CROSS-REFERENCE TO RELATED APPLICATION

The present application is a continuation and claims priority to U.S. non-provisional patent application Ser. No. 13/915,626, filed Jun. 11, 2013, which claims priority to provisional patent application Ser. No. 61/812,232, filed Apr. 15, 2013.

BACKGROUND

In active depth sensing, such as used by active stereo systems, a projector projects patterns of light such as infrared (IR) dots or lines to illuminate a scene being sensed. The projected patterns are then captured by a camera/sensor (two or more in stereo systems), with the image (or images) processed to compute a depth map or the like.

For example, in stereo systems, stereo cameras capture two images from different viewpoints. Then, for example, one way to perform depth estimation with a stereo pair of images is to find correspondences of local patches between the images, e.g., to correlate each projected and sensed local dot pattern in the left image with a counterpart local dot pattern in the right image. Once matched, the projected patterns within the images may be correlated with one another, and disparities between one or more features of the correlated dots used to estimate (e.g., triangulate) a depth to that particular dot pair.

IR lasers have been used to produce such patterns. In order to allow the stereo system to work over a wide range of depths, more powerful lasers (around 1W or more) are needed. At such power levels, multi-mode lasers are more cost-effective. However, using multi-mode lasers results in the design pattern looking blurrier at closer distances. This is problematic in active stereo depth sensing, because correlating the correct pairs of left and right pairs of dots is subject to more errors when the dots are blurred.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards an intensity-modulated light pattern for active sensing. A projector including a laser and a diffractive optical component projects a light pattern towards a scene. The diffractive optical component is configured to output the light pattern as a plurality of sets of sub-patterns, with each set corresponding to a different range of intensities.

One or more aspects are directed towards generating a grid comprising a first set of points, associating each point in the first set with an intensity value that is within a first intensity range, adding a second set of points between subsets of points of the first set of points and associating each point in the second set with an intensity value that is within a second intensity range. This subdivision process may be repeated if necessary. A diffractive optical component may be encoded based upon the first set of points and the second set of points. Another variant is to generate a random set of points with approximately uniform density throughout, with a random subset of them having a specified range of intensities, and the rest having a different range of intensities.

One or more aspects are directed towards projecting light through a diffractive optical component to project a pattern comprising a first set of spots corresponding to a first intensity range, and a second set of spots corresponding to a second intensity range. The positions of the spots in the first set are based upon an initial grid layout, and the positions of spots in the second set of spots are based upon the positions of the first set of spots. The first set of spots and the second set of spots are sensed as left and right stereo camera images. The images are processed to correlate spots in the left image with spots in the right image, in which scanlines of the images are not aligned with the initial grid layout.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards having a light pattern projected into a scene, in which the light pattern is configured to provide for enhanced pattern matching, including at different depths to illuminated objects. In one aspect, a light pattern includes intermixed points of light (e.g., spots such as dots) of different intensities. The technology also leverages the depth-dependent appearance of the pattern by having the pattern include points that are semi-randomly distributed.

As will be understood, the peak intensities of neighboring points are different. This results in local changes in intensity independent of the scene depth, to allow stereo matching to function properly.

It should be understood that any of the examples herein are non-limiting. For example, the projected light pattern may use spots, generally exemplified herein as dots, but the dots may be of any shape. As another, the dots are exemplified as arranged according to a triangular grid, however this is only one example, and other arrangements (e.g., a hexagonal grid) may be implemented. Rotation angles of the patterns (described below), different ranges or values of intensity peaks (e.g., for large, medium and small intensities) from those described herein may be used, and so on. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in active depth sensing and image processing in general.

Figure 1:
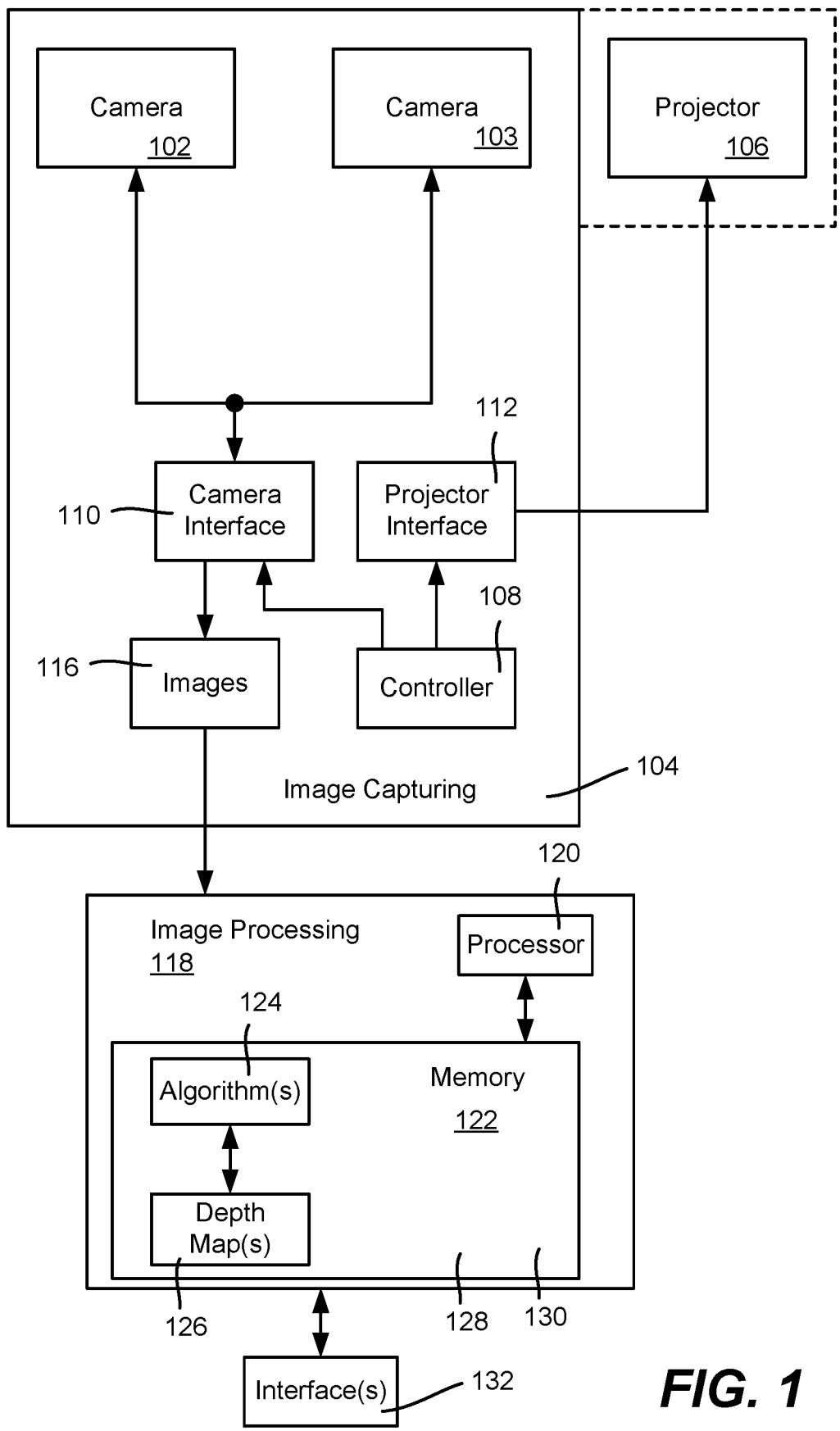
FIG. 1 is a block diagram representing example components that may be used to project and capture a light pattern modulated with different intensities, according to one or more example implementations.

FIG. 1 shows an example system in which stereo cameras 102 and 103 of an image capturing system or subsystem 104 capture images synchronized in time (e.g., the cameras are "genlocked"). In one implementation the cameras capture infrared (IR) images, as IR does not affect the visible appearance of the scene (which is highly advantageous, such as in video conferencing and object modeling applications). As can be readily appreciated, in some scenarios such as studio environments, more than two IR depth-sensing cameras may be present. Further, one or more other cameras may be present in a given system, such as RBG cameras, and such other cameras may be used to help correlate dot pairs in different stereo images, for example.

In FIG. 1, a projector 106 is shown that projects an IR pattern onto a scene, such as a pattern of spots (e.g., dots) or a line pattern, although other spot shapes and/or pattern types may be used. For purposes of brevity, dots are generally described hereinafter. By illuminating the scene with a relatively large number of distributed infrared dots, the cameras 102 and 103 capture texture data as part of the infrared image data. As described herein, to facilitate more accurate dot matching between left and right images, the dots in the pattern are arranged with different intensities, and also the pattern may be rotated relative to the cameras. The pattern with intensity modulation may be designed (e.g., encoded) into a diffractive optical component (a diffractive optical element or combination of elements) that disperse laser light into the scene, e.g., as a dot pattern.

Figure 2:
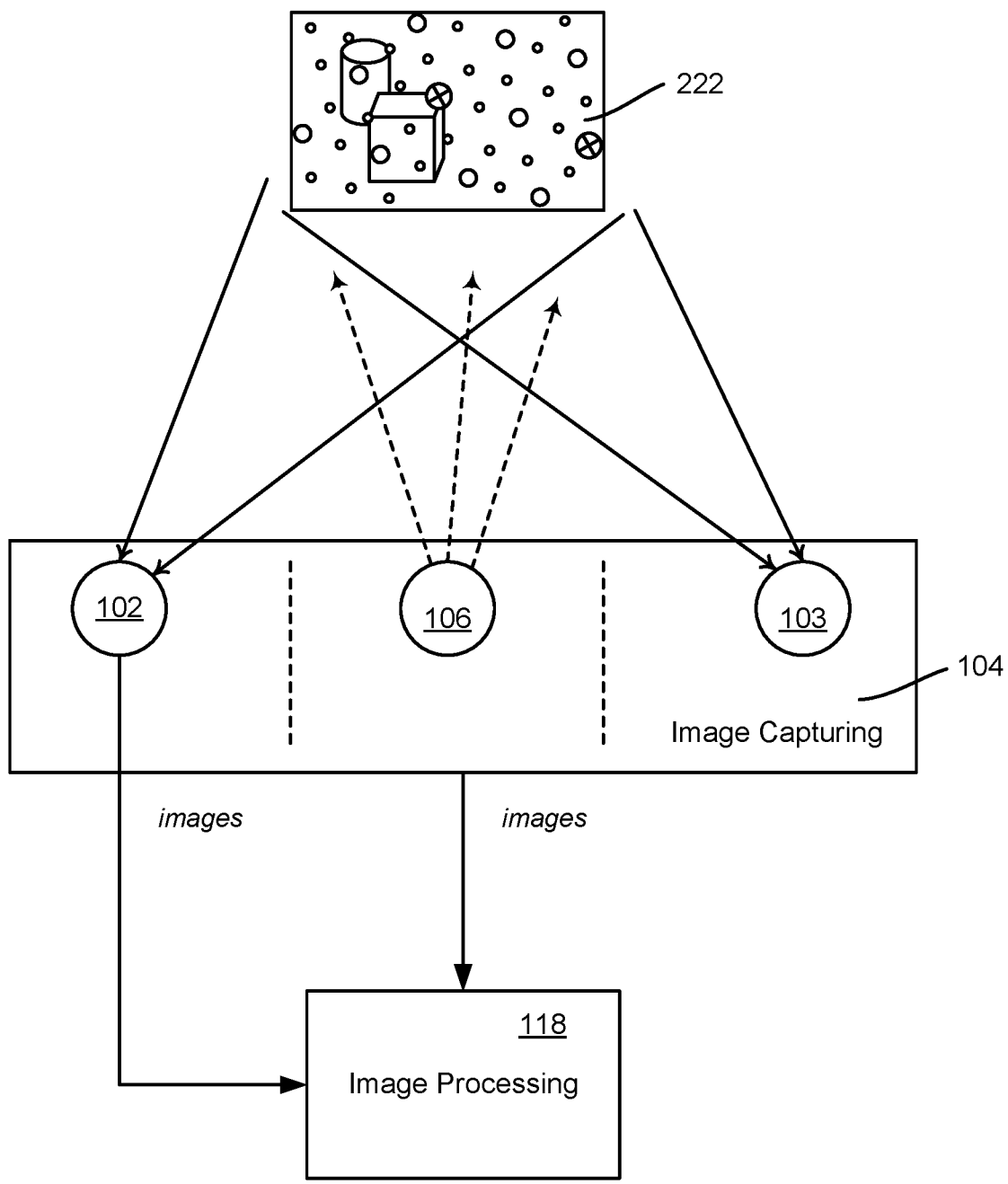
FIG. 2 is a representation of an example of projecting dots having different intensities into a scene, according to one or more example implementations.

FIG. 2 exemplifies this projection concept. The projector 106, represented as a circle in between the stereo cameras 102 and 103, projects a dot pattern onto a scene 222. The dot pattern is modulated with different intensities, and the dot pattern may be rotated (e.g., fifteen degrees) relative to the cameras' orientation. The cameras 102 and 103 capture the dots as they reflect off of object surfaces in the scene 222 and (possibly) the background. In general, one or more features of the captured dots are indicative of the distance to the reflective surface. Note that FIG. 2 is not intended to be to scale, nor convey any sizes, distance, dot distribution pattern, dot density and so on. However, it is understood that different intensities exist in the dot pattern, and that the dot pattern may be rotated relative to the cameras.

Note that the placement of the projector 106 may be outside the cameras (e.g., FIG. 1), or in between the cameras (FIG. 2) or at another location, such as above or below one or both of the cameras. The examples herein are in no way limiting of where the cameras and/or projector are located relative to one another, and similarly, the cameras may be positioned at different positions relative to each other.

In one implementation the example image capturing system or subsystem 104 includes a controller 108 that via a camera interface 110 controls the operation of the cameras 102 and 103. The exemplified controller via a projector interface 112 also controls the operation of the projector 106. For example, the cameras 102 and 103 are synchronized (genlocked) to capture stereo images at the same time, such as by a controller signal (or different signals for each camera). The projector 106 may be turned on or off, pulsed, and otherwise have one or more parameters controllably varied, for example.

The images 116 captured by the cameras 102 and 103 are provided to an image processing system or subsystem 118. In some implementations, the image processing system 118 and image capturing system or subsystem 104, or parts thereof, may be combined into a single device. For example a home entertainment device may include all of the components shown in FIG. 1 (as well as others not shown). In other implementations, parts (or all) of the image capturing system or subsystem 104, such as the cameras and projector, may be a separate device that couples to a gaming console, personal computer, mobile device, dedicated processing device and/or the like. Indeed, a gaming console is exemplified in FIG. 10 as one environment that may be used for processing images into depth data.

The image processing system or subsystem 118 includes a processor 120 and a memory 122 containing one or more image processing algorithms 124. One or more depth maps 126 may be obtained via the algorithms 124 such as by extracting matching features (such as dots and/or lines). For example, as is known, such as described in U.S. published patent application no. 20130100256, hereby incorporated by reference, different dots or other projected elements have different features when captured, including intensity (brightness), depending on the distance from the projector to the reflective surfaces and/or the distance from the camera to the reflective surfaces. As is also known, the dots in different images taken at the same time (e.g., with genlocked stereo cameras) may be correlated with one another, such as by matching small (e.g., RGB) patches between RGB color images of the same scene captured at the same instant. Thus, with captured images, known algorithms can determine individual depth-related features (depth maps) by matching projected light components (e.g., dots) in each image, using disparities of certain features between matched dots to determine depths. This is one way in which a depth map may be obtained via stereo image processing. Also shown in FIG. 1 is an interface 132 to the image processing system or subsystem 118, such as for connecting a keyboard, game controller, display, pointing device microphone for speech commands and/or the like as appropriate for a user to interact with an application or the like that uses the depth map.

Figure 3A:
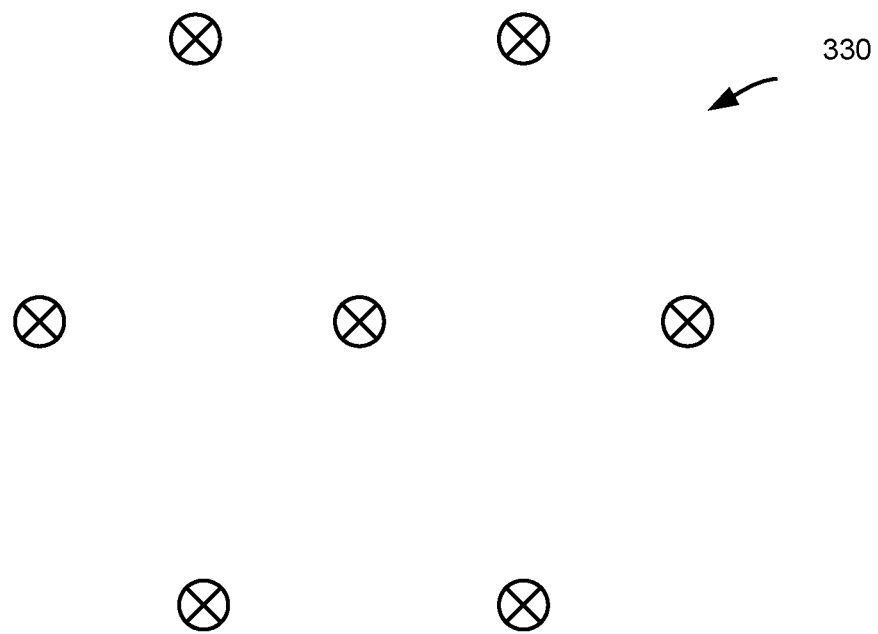
FIGS. 3A and 3B are representations of a pattern may be designed based upon a grid, and subdivision of points aligned via the grid, to facilitate having points with different intensities, according to one or more example implementations.
Figure 3B:
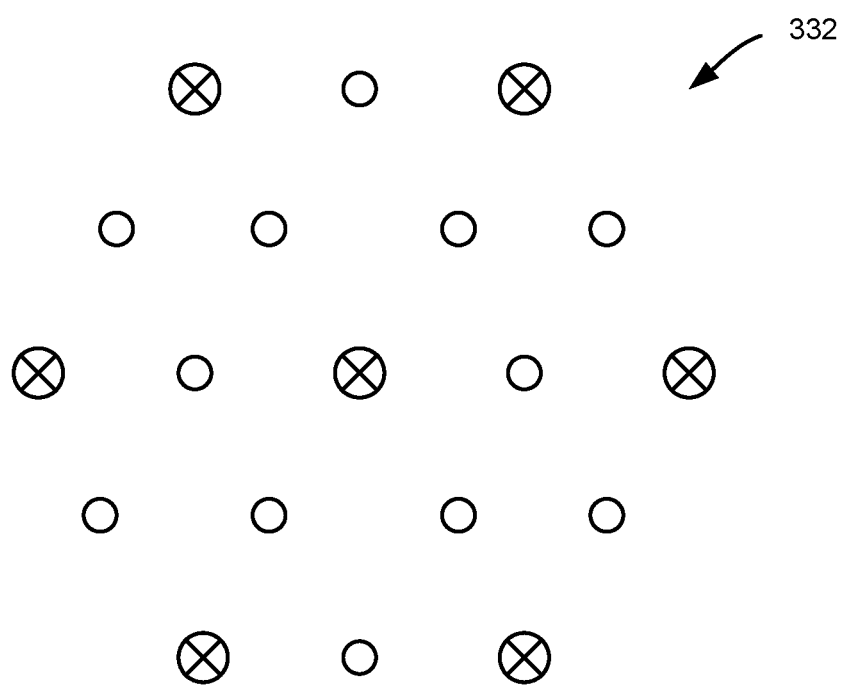
Figure 4:
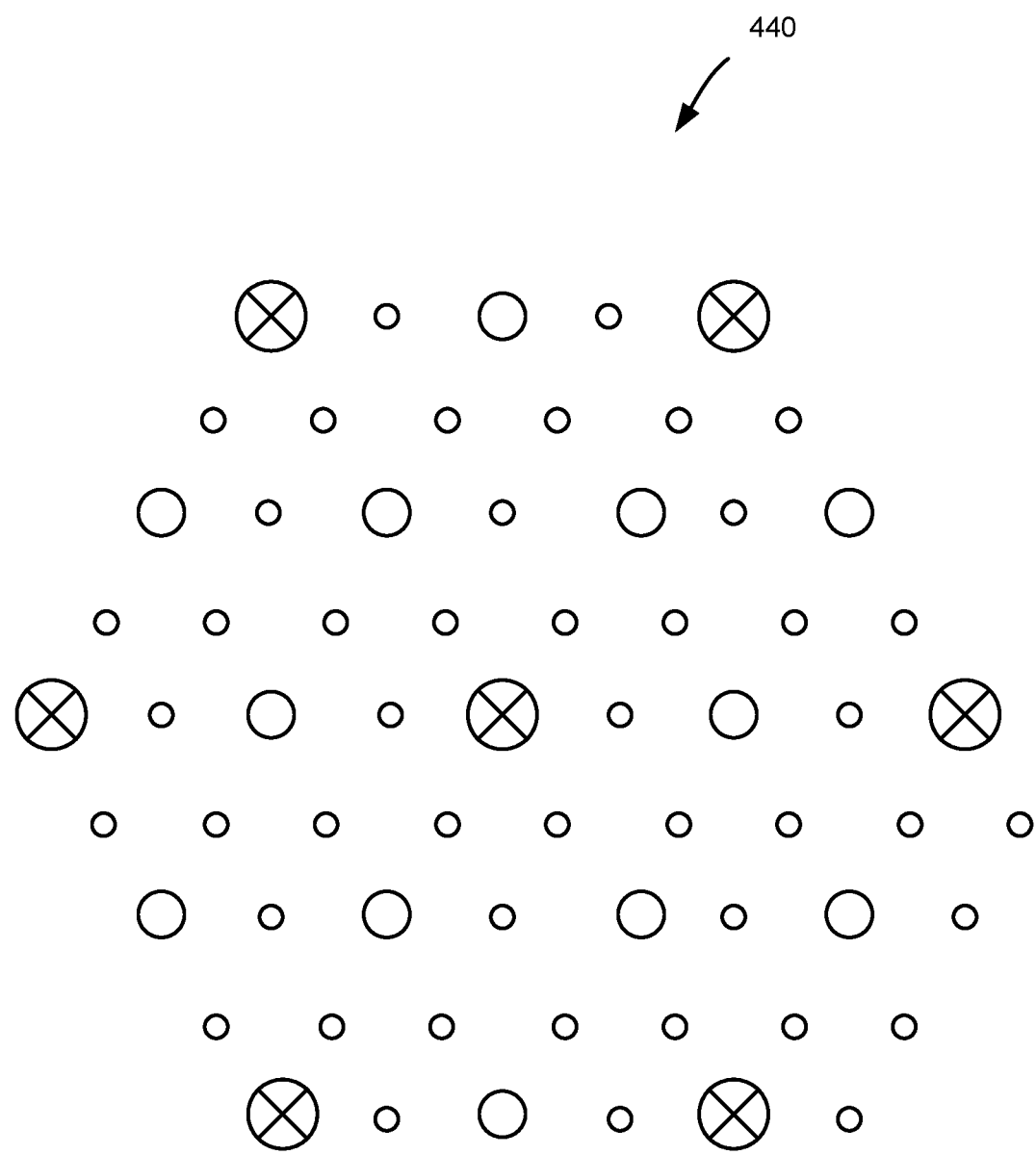
FIG. 4 is a representation of further subdivision of points having different intensities, according to one or more example implementations.

FIGS. 3A and 3B, along with FIG. 4 show the concept of subdivision, in which dots of larger intensity (larger dots with an "X" shaped cross therein) are arranged in a triangular grid layout 330 (FIG. 3A). In FIG. 3B, each triangle of the larger intensity dots is subdivided by triangles of lesser intensity dots (circles), providing the pattern 332. In FIG. 4, each of those sub-triangle sub-patterns is further subdivided by even lesser intensity dots (smaller-sized circles relative to those in FIG. 3B). Thus, FIG. 4 represents a triangular pattern 440 of higher intensity dots, medium intensity dots, and lower intensity dots. The dot sizes relative to the distribution pattern and each other are only intended to illustrate distribution of dots of differing relative intensities or intensity ranges, and are not intended to convey any particular intensity levels or ranges.

Figure 5:
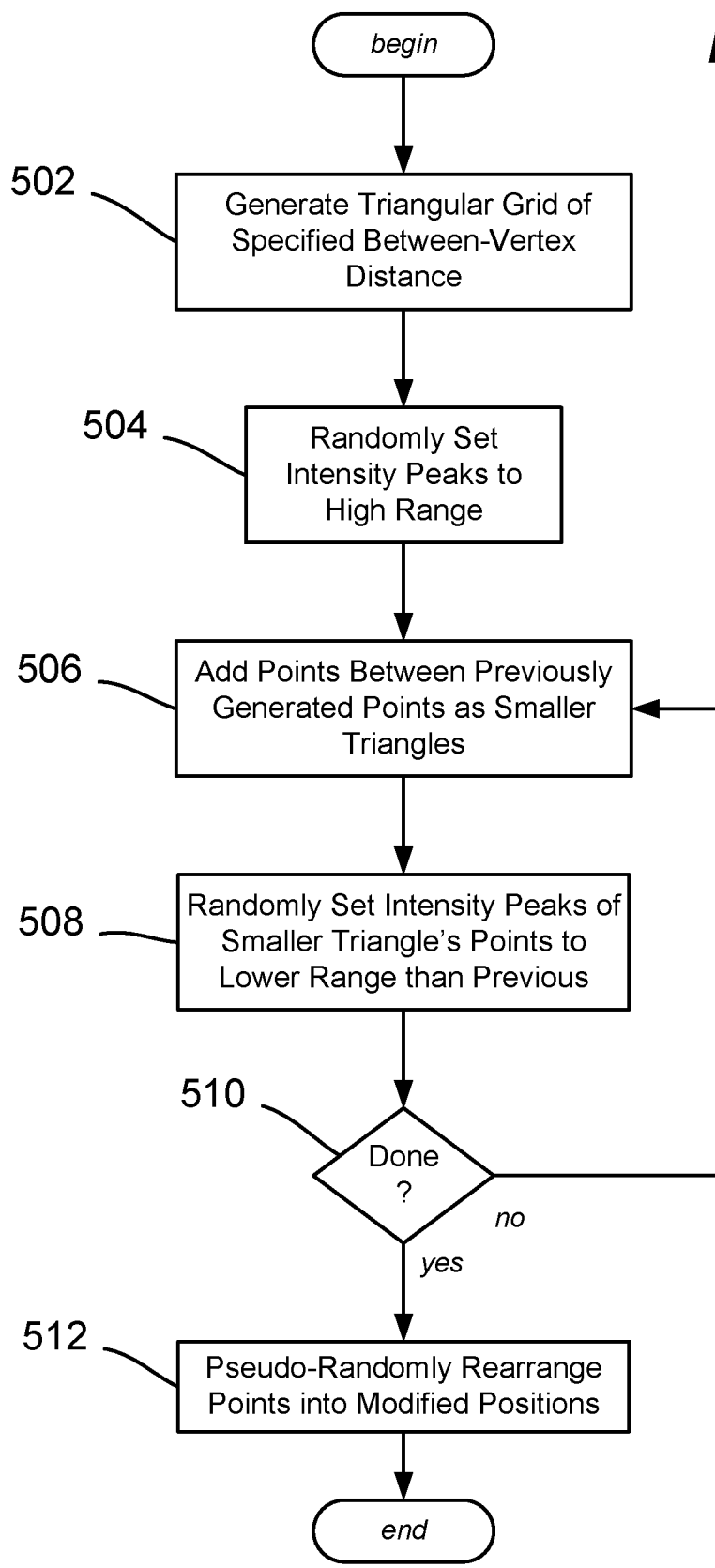
FIG. 5 is a flow diagram representing example steps in laying out points for of different intensities, such as for encoding corresponding data into a diffractive optical element, according to one or more example implementations.

FIG. 5 summarizes subdivision, beginning at step 502 where in this example a triangular grid of a specified between-vertex distance is generated, e.g., comprising regular triangles or substantially regular triangles (or other polygons). The intensity peaks are set to a high value; however rather than being the same intensity value for each point, the high values may be randomly set to be within a high range (step 504), e.g., between 200-255 (with 255 being the maximum intensity). Note that as used herein, an intensity "range" includes a range with as little as one single fixed intensity value, e.g., a range may be from 200 to 200.

Step 506 represents adding points between the previously generated points, e.g., as smaller sets of triangles (a "subdivision") such as shown in FIG. 3B. Step 508 randomly sets the intensity peaks of these points to be within a lower range, e.g., between 100-125. Note that these example intensity ranges do not overlap one another, but it is feasible to have different ranges overlap to an extent; if weighted random techniques may be used to bias most values in overlapping ranges away from one another.

Step 510 evaluates whether subdivision has been completed to the lowest desired level, which is configurable. Thus, by returning to step 506, another subdivision of points may be optionally added, (such as exemplified in FIG. 4), with an even lower range of intensities, and so on, until the desired pattern and sets of intensities/intensity ranges is reached. The result is a projection pattern that contains sub-patterns, in this example different sets of triangular sub-patterns, such as a larger intensity sub-pattern set and a smaller-intensity sub-pattern set (FIG. 3B), or small, medium and large intensity sub-pattern sets (FIG. 4) and so on. In general, the sets/sub-patterns are interleaved via subdivision.

Note that once the intensity-modulated pattern is designed, such as via the example steps of FIG. 5, the diffractive optical element or elements may be manufactured in known ways to output that pattern. Various eye safe diffractive optical element arrangements are described in the aforementioned provisional patent application Ser. No. 61/812,232. However, as another (optional) step, step 512 represents pseudo-randomly rearranging (e.g., slightly "littering") at least some of the points into modified positions, such as to further reduce repetition intervals. Typically this repositioning of a point is small relative to its respective triangle (or other grid pattern), whereby the regular polygon or substantially regular polygon is now modified to be only generally/approximately regular.

Figure 6:
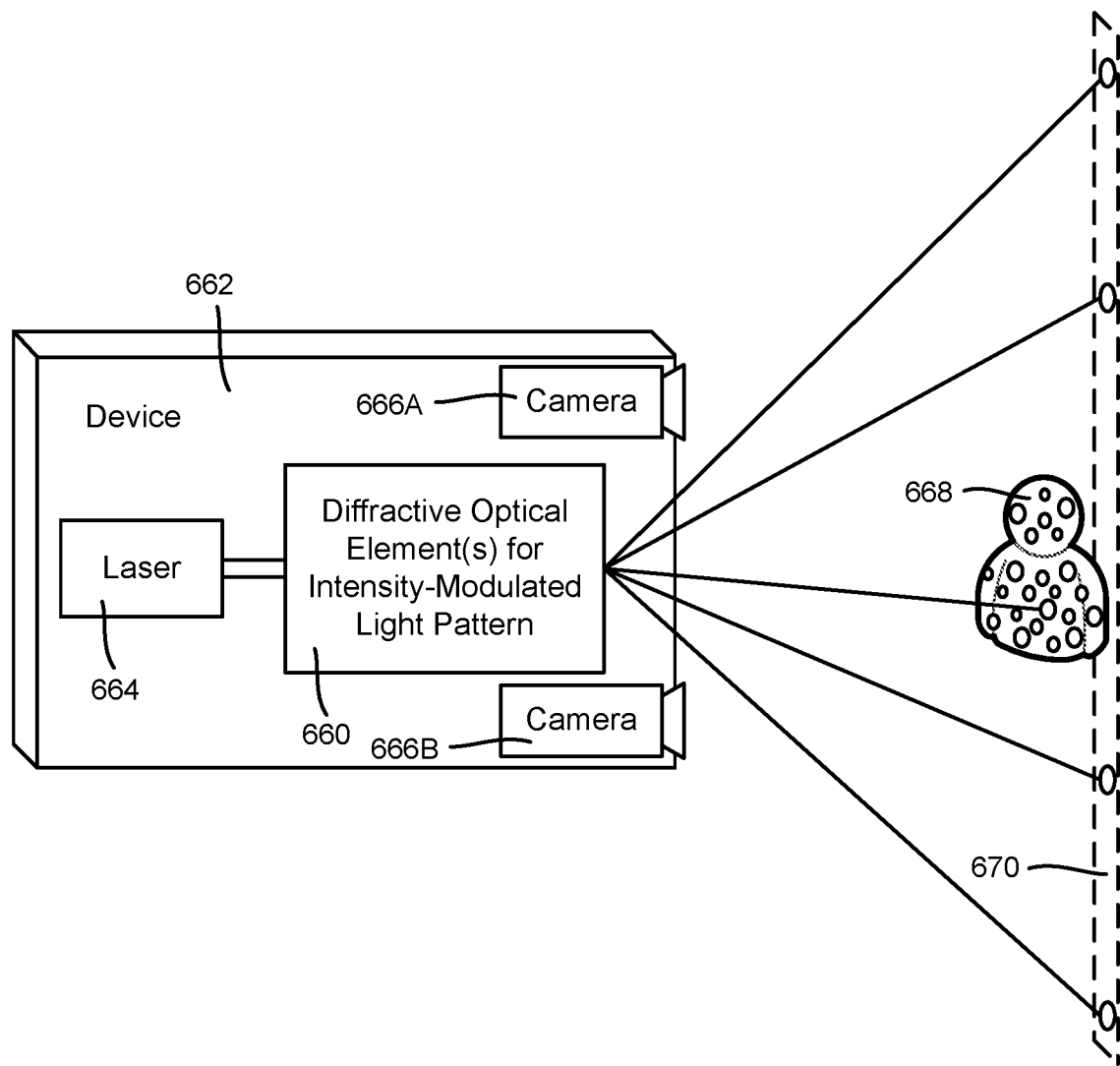
FIG. 6 is a block diagram representing example components of a device that projects a diffraction pattern of light having different intensities, according to one example implementation.
Figure 7:
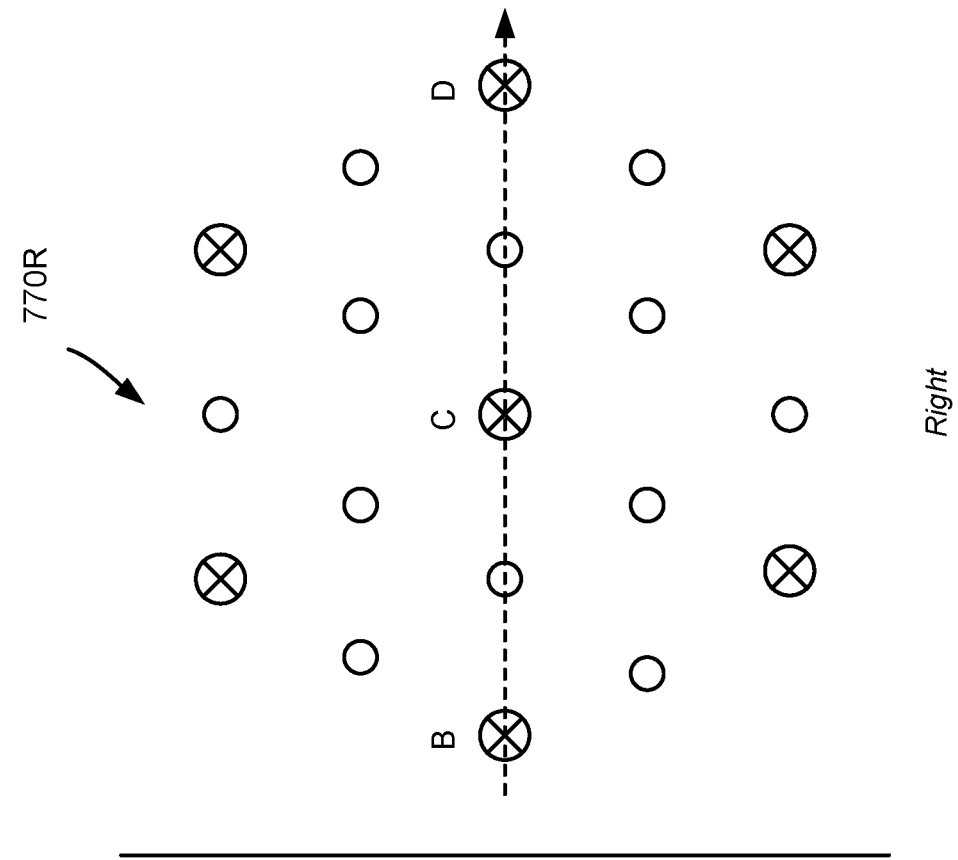
FIGS. 7 and 8 are representations of how non-rotation versus rotation of a projected pattern affects scanning of captured images that include the projected pattern, according to one or more example implementations.

FIG. 6 is one such example configuration in which a diffractive optical component 660 (e.g., diffractive optical one or more elements) is configured to output an intensity-modulated illumination pattern. The component 660 may be built into or coupled to device 662, such as a built into or part of a home entertainment device. A laser 664 (e.g., multimode) provides the light source. Stereo cameras 666A and 666B capture the reflection from an illuminated object (e.g., person 668) and use the captured images as desired; note that a single camera may be used in a given implementation.

As represented n FIG. 6, the diffractive optical component 660 disperses the laser light into a large number of spots based upon the pattern designed as described herein, such as on the order of 100,000 dots. Some of the pattern is represented in FIG. 1 by the solid lines coming from the element and by the dots on the object/person 668 and image plane 670. Note that as with any of the figures herein, neither FIG. 6 nor its components are intended to be to scale or convey any particular distance, distribution and/or the like.

Figure 8:
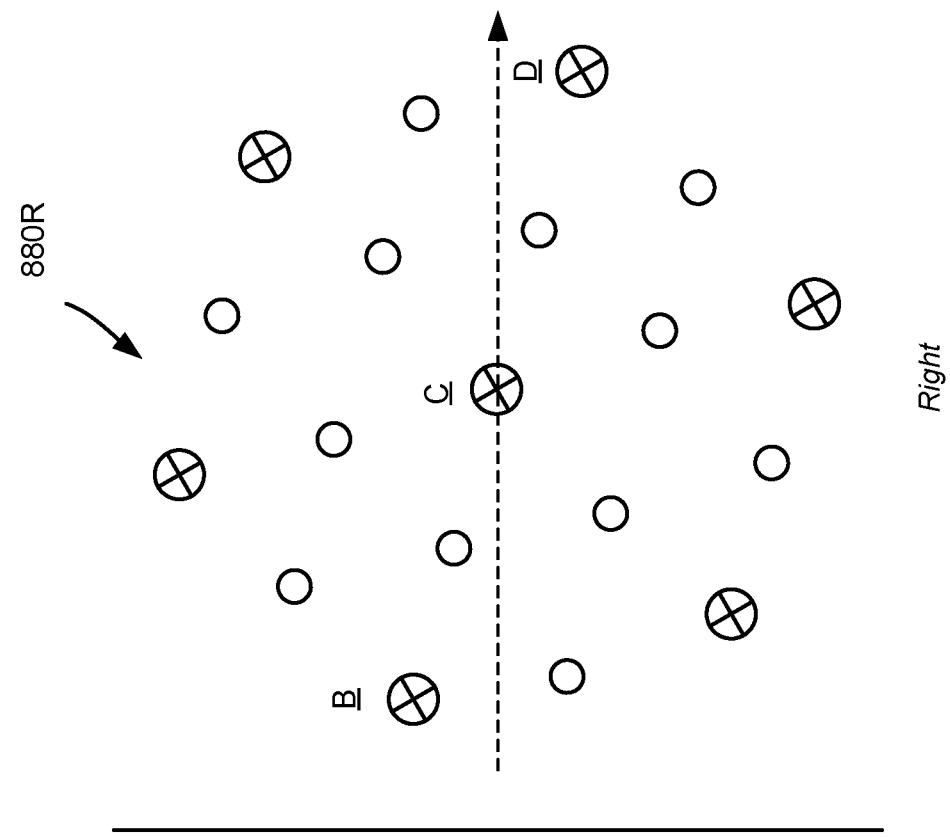
Figure 8:
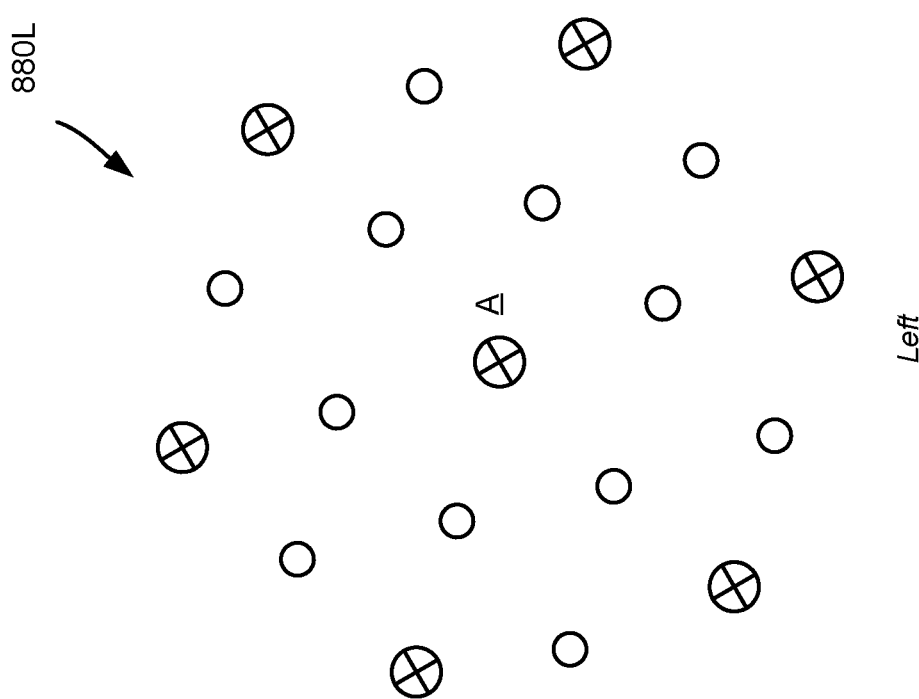

As represented in FIG. 6, the diffractive optical component 660 disperses the laser light into a large number of spots based upon the pattern designed as described herein, such as on the order of 100,000 dots. Some of the pattern is represented in FIG. 6 by the solid lines coming from the component 660 and by the dots on the object/person 668 and image plane 670. Note that as with any of the figures herein, neither FIG. 6 nor its components are intended to be to scale or convey any particular distance, distribution and/or the like. In FIG. 8, camera-captured dots of part of a rotated left pattern 880L are shown alongside parts of a rotated right pattern 880R. As can be seen, when scanning a line of pixels to match dot A, for example, neither dot B nor dot D will be encountered. In this way, the rotation (e.g., by fifteen degrees in this example, although other rotational angles may be used) helps to provide a larger repetition interval along the scanline (x-direction).

Figure 9:
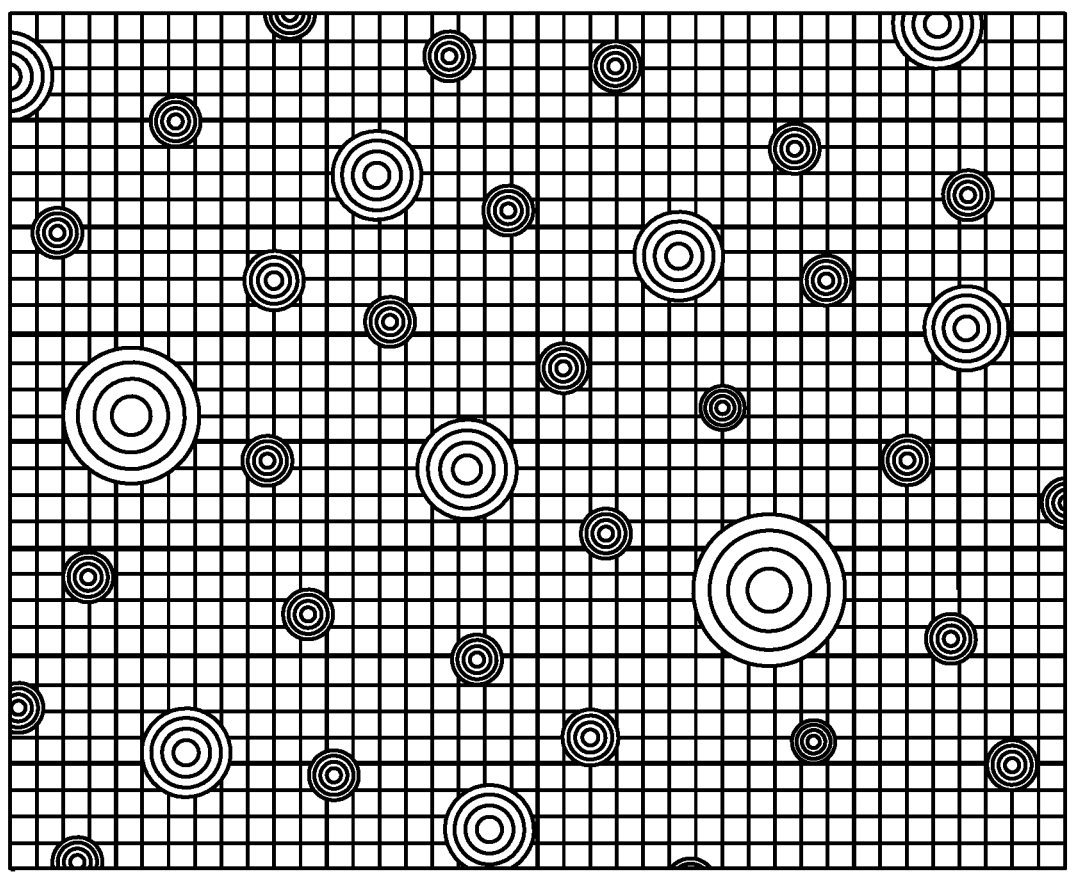
FIG. 9 is a representation of how dots of different intensities may be captured in a part of an image, and moved over time, according to one or more example implementations.

Rotation and intensity distribution is generally shown in the partial image representation 990 of FIG. 9, where the dots are illustrated by concentric circles, and (some relative) intensity by the sizes thereof. The pixels are represented by the square blocks behind the dots. Note that in FIG. 9 the different diameters of the circles only suggest changes in intensity; the size of the circles and the grid squares are not intended to convey any particular scale, resolution, or the like, nor any particular intensity value or relative intensity values (other than within at least two different ranges). Further, the density of the dots and/or their sizes or distribution are not intended to represent any actual density and/or distribution.

As can be seen, there is provided a light pattern modulated with different intensities. The pattern may be based upon a grid, and projected such that the cameras that capture the light pattern are not aligned with the grid on which the pattern was based. The intensity-modulated pattern provides for more robust stereo matching/depth sensing.

Example Operating Environment

It can be readily appreciated that the above-described implementation and its alternatives may be implemented on any suitable computing device, including a gaming system, personal computer, tablet, DVR, set-top box, smartphone and/or the like. Combinations of such devices are also feasible when multiple such devices are linked together. For purposes of description, a gaming (including media) system is described as one exemplary operating environment hereinafter.

Figure 10:
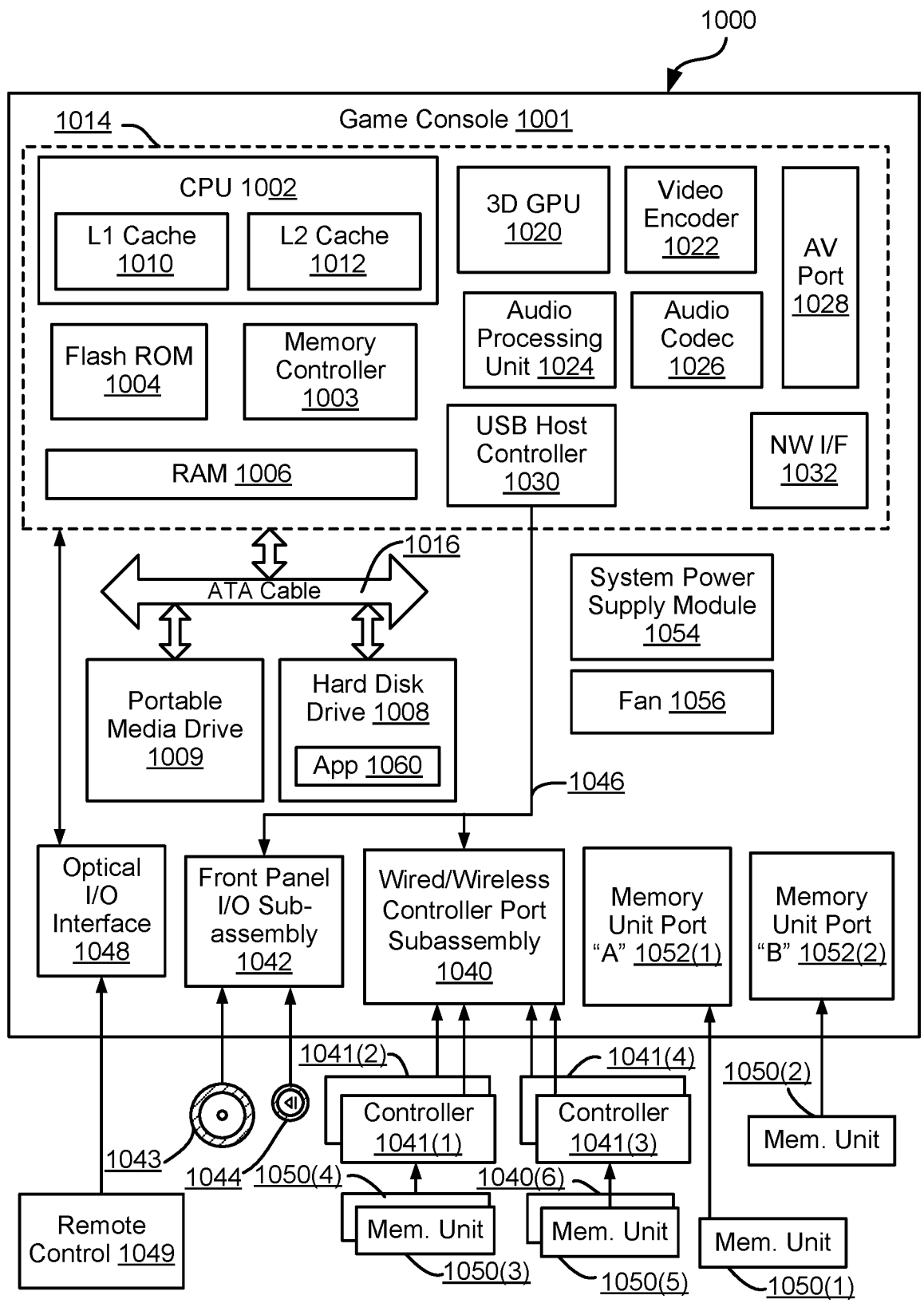
FIG. 10 is a block diagram representing an exemplary non-limiting computing system or operating environment, in the form of a gaming system, into which one or more aspects of various embodiments described herein can be implemented.

FIG. 10 is a functional block diagram of an example gaming and media system 1000 and shows functional components in more detail. Console 1001 has a central processing unit (CPU) 1002, and a memory controller 1003 that facilitates processor access to various types of memory, including a flash Read Only Memory (ROM) 1004, a Random Access Memory (RAM) 1006, a hard disk drive 1008, and portable media drive 1009. In one implementation, the CPU 1002 includes a level 1 cache 1010, and a level 2 cache 1012 to temporarily store data and hence reduce the number of memory access cycles made to the hard drive, thereby improving processing speed and throughput.

The CPU 1002, the memory controller 1003, and various memory devices are interconnected via one or more buses (not shown). The details of the bus that is used in this implementation are not particularly relevant to understanding the subject matter of interest being discussed herein. However, it will be understood that such a bus may include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In one implementation, the CPU 1002, the memory controller 1003, the ROM 1004, and the RAM 1006 are integrated onto a common module 1014. In this implementation, the ROM 1004 is configured as a flash ROM that is connected to the memory controller 1003 via a Peripheral Component Interconnect (PCI) bus or the like and a ROM bus or the like (neither of which are shown). The RAM 1006 may be configured as multiple Double Data Rate Synchronous Dynamic RAM (DDR SDRAM) modules that are independently controlled by the memory controller 1003 via separate buses (not shown). The hard disk drive 1008 and the portable media drive 1009 are shown connected to the memory controller 1003 via the PCI bus and an AT Attachment (ATA) bus 1016. However, in other implementations, dedicated data bus structures of different types can also be applied in the alternative.

A three-dimensional graphics processing unit 1020 and a video encoder 1022 form a video processing pipeline for high speed and high resolution (e.g., High Definition) graphics processing. Data are carried from the graphics processing unit 1020 to the video encoder 1022 via a digital video bus (not shown). An audio processing unit 1024 and an audio codec (coder/decoder) 1026 form a corresponding audio processing pipeline for multi-channel audio processing of various digital audio formats. Audio data are carried between the audio processing unit 1024 and the audio codec 1026 via a communication link (not shown). The video and audio processing pipelines output data to an A/V (audio/video) port 1028 for transmission to a television or other display/speakers. In the illustrated implementation, the video and audio processing components 1020, 1022, 1024, 1026 and 1028 are mounted on the module 1014.

FIG. 10 shows the module 1014 including a USB host controller 1030 and a network interface (NW I/F) 1032, which may include wired and/or wireless components. The USB host controller 1030 is shown in communication with the CPU 1002 and the memory controller 1003 via a bus (e.g., PCI bus) and serves as host for peripheral controllers 1034. The network interface 1032 provides access to a network (e.g., Internet, home network, etc.) and may be any of a wide variety of various wire or wireless interface components including an Ethernet card or interface module, a modem, a Bluetooth module, a cable modem, and the like.

In the example implementation depicted in FIG. 10, the console 1001 includes a controller support subassembly 1040, for supporting four game controllers 1041(1)-1041(4). The controller support subassembly 1040 includes any hardware and software components needed to support wired and/or wireless operation with an external control device, such as for example, a media and game controller. A front panel I/O subassembly 1042 supports the multiple functionalities of a power button 1043, an eject button 1044, as well as any other buttons and any LEDs (light emitting diodes) or other indicators exposed on the outer surface of the console 1001. The subassemblies 1040 and 1042 are in communication with the module 1014 via one or more cable assemblies 1046 or the like. In other implementations, the console 1001 can include additional controller subassemblies. The illustrated implementation also shows an optical I/O interface 1048 that is configured to send and receive signals (e.g., from a remote control 1049) that can be communicated to the module 1014.

FIG. 10 shows the module 1014 including a USB host controller 1030 and a network interface (NW I/F) 1032, which may include wired and/or wireless components. The USB host controller 1030 is shown in communication with the CPU 1002 and the memory controller 1003 via a bus (e.g., PCI bus) and serves as host for peripheral controllers. The network interface 1032 provides access to a network (e.g., Internet, home network, etc.) and may be any of a wide variety of various wire or wireless interface components including an Ethernet card or interface module, a modem, a Bluetooth module, a cable modem, and the like. A system power supply module 1054 provides power to the components of the gaming system 1000. A fan 1056 cools the circuitry within the console 1001.

An application 1060 comprising machine instructions is typically stored on the hard disk drive 1008. When the console 1001 is powered on, various portions of the application 1060 are loaded into the RAM 1006, and/or the caches 1010 and 1012, for execution on the CPU 1002. In general, the application 1060 can include one or more program modules for performing various display functions, such as controlling dialog screens for presentation on a display (e.g., high definition monitor), controlling transactions based on user inputs and controlling data transmission and reception between the console 1001 and externally connected devices.

The gaming system 1000 may be operated as a standalone system by connecting the system to high definition monitor, a television, a video projector, or other display device. In this standalone mode, the gaming system 1000 enables one or more players to play games, or enjoy digital media, e.g., by watching movies, or listening to music. However, with the integration of broadband connectivity made available through the network interface 1032, gaming system 1000 may further be operated as a participating component in a larger network gaming community or system.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A system comprising:
 a projector that projects a light pattern towards a scene, the projector including:
 two or more stereo cameras comprising a first stereo camera and a second stereo camera;

a multimode laser; and
a diffractive optical component configured to:
diffract the light pattern from the multimode laser into a dot pattern comprising a first set of points of a higher intensity range and a second set of points of a medium intensity range that is less than the higher intensity range, wherein the second set of points are projected within polygons of the first set of points, wherein the first set of points comprise points of different intensities within the higher intensity range,
rearrange one or more points of the second set of points into modified positions, and
sense the first set of points by one or more stereo cameras.

2. The system of claim 1, wherein the two or more stereo cameras are configured to sense the first set of points and the second sets of points as left and right stereo camera images.

3. The system of claim 2, the system further comprising:
an image processing component configured to process the stereo camera images into depth maps.

4. The system of claim 2, wherein the projector is incorporated into a single device with the two or more stereo cameras.

5. The system of claim 4, wherein two or more stereo cameras are positioned on opposite sides of the projector.

6. The system of claim 1, wherein the first set of points, and the second set of points are interleaved via subdivision.

7. The system of claim 1, wherein at least one of the points of the first set of points or the second set of points is randomly or pseudo-randomly assigned an intensity value within the higher intensity range.

8. The system of claim 7, wherein assigning intensity values to the points of the first set of points and the second set of points involves applying one or more weighted random techniques to bias assigned intensity values away from values of the medium intensity range.

9. The system of claim 1, wherein the projected light pattern comprises infrared light for sensing by infrared stereo cameras or visible light for sensing by color stereo cameras.

10. A method of projecting, through a presentation device, a light pattern toward a scene for use in depth sensing, the method comprising:
generating a first set of points oriented in a grid as a collection of polygons;
assigning different intensities to the first set of points within a first intensity range;
generating a second set of points oriented within the polygons of the first set of points;
assigning different intensities to the second set of points within a second intensity range that is lower than the first intensity range;
projecting the first set of points and the second set of points as the light pattern toward the scenes;
rearranging one or more points of the second set of points into modified positions, and
sensing the first set of points by one or more stereo cameras.

11. The method of claim 10 further comprising:
wherein the first set of points are sensed by a right stereo camera and the second set of points are sensed by a left stereo camera.

12. The method of claim 11 wherein the light pattern is outputted by the diffractive component in two instances at different angles rotated toward at least one of the one or more stereo cameras.

13. The method of claim 11, further comprising:
processing, by an image processing component, the light pattern into a depth map.

14. The method of claim 13, further comprising extracting matching features from the light pattern.

15. The method of claim 10, further comprising:
generating a third set of points oriented within the polygons of the first set of points;
assigning different intensities to the third set of points within a third intensity range that differs from the first intensity range and the second intensity range; and
projecting the third set of points as part of the light pattern.

16. The method of claim 10, further comprising randomly or pseudo-randomly selecting an intensity value within the first intensity range for at least some of the points in the first set of points.

17. The method of claim 10, wherein the first intensity range comprises a minimum intensity value and a maximum intensity value, the minimum intensity value being numerically smaller than the maximum intensity value.

18. The method of claim 10 wherein said projecting the first set of points and the second set of points as the light pattern includes pulsing at least one of the first set of points or the second set of points.

19. The method of claim 10, wherein the first set of points are sensed by a right stereo camera and the second set of points are sensed by a left stereo camera.

20. A method comprising:
generating a first set of points oriented in a grid as a collection of polygons;
assigning different intensities to the first set of points within a first intensity range;
generating a second set of points oriented within the polygons of the first set of points;
assigning different intensities to the second set of points within a second intensity range that is higher than the first intensity range;
projecting the first set of points and the second set of points as the light pattern toward the scenes;
rearranging one or more points of the second set of points into modified positions, and
sensing the first set of points by one or more stereo cameras.

* * * * *